United States Patent
Parient et al.

(10) Patent No.: US 12,008,657 B2
(45) Date of Patent: *Jun. 11, 2024

(54) SYSTEM AND METHOD FOR COMPUTING AN ORGANIZATION'S INSURANCE UNDERWRITING SCORE FOR CYBER INSURANCE USING AI

(71) Applicant: CYBERWRITE INC.

(72) Inventors: George Rami Parient, Ramat Hasharon (IL); Uri Fleyder-Kotler, Kadima (IL); Nir Perry, Tel Aviv (IL)

(73) Assignee: CYBERWRITE INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,514

(22) Filed: Feb. 7, 2023

(65) Prior Publication Data
US 2023/0230169 A1    Jul. 20, 2023

Related U.S. Application Data

(63) Continuation-in-part of application No. 17/510,483, filed on Oct. 26, 2021, now Pat. No. 11,606,382.

(51) Int. Cl.
G06Q 40/08     (2012.01)
G06Q 10/0635   (2023.01)
G06Q 10/0639   (2023.01)

(52) U.S. Cl.
CPC ......... *G06Q 40/08* (2013.01); *G06Q 10/0635* (2013.01); *G06Q 10/06393* (2013.01)

(58) Field of Classification Search
CPC ............ H04L 63/1433; G06K 9/6227; G06K 9/6282; G06N 20/20; G06Q 40/08; G06Q 10/0635; G06Q 10/06393
See application file for complete search history.

(56) References Cited

U.S. PATENT DOCUMENTS

| | | | |
|---|---|---|---|
| 2010/0114634 A1* | 5/2010 | Christiansen | G06Q 30/018 705/317 |
| 2010/0275263 A1* | 10/2010 | Bennett | G06F 21/577 345/589 |
| 2020/0304537 A1* | 9/2020 | Zorlular | H04L 41/06 |

OTHER PUBLICATIONS

Rao, R.S. and Pais, A.R., 2019. Detection of phishing websites using an efficient feature-based machine learning framework. Neural Computing and Applications, 31(8), pp. 3851-3873.*

* cited by examiner

*Primary Examiner* — Zhitong Chen
(74) *Attorney, Agent, or Firm* — AlphaPatent Associates Ltd.; Daniel J. Swirsky

(57) ABSTRACT

Evaluating an organization's risk to be exposed to cyber security events, by collecting security-based risk indicators about multiple organizations and an indication on whether or not each of the multiple organizations suffered a security event, inputting values of the security-based risk indicators about the multiple organization into a software model, running the software model multiple times, where the software model outputs multiple sets of one or more classifiers, where each set of one or more classifiers distinguishes organizations that suffered the security event from organizations that did not suffer the security event, where the one or more classifiers include classifiers selected from the security-based risk indicators, assigning a risk score for a specific organization according to the importance of classifiers related to the specific organization, and computing an underwriting score for the specific organization.

17 Claims, 4 Drawing Sheets

SYSTEM AND METHOD FOR COMPUTING AN ORGANIZATION'S INSURANCE UNDERWRITING SCORE FOR CYBER INSURANCE USING AI

FIELD

The invention relates generally to computerized processes to evaluate the likelihood that specific organizations are exposed to cyber security events.

BACKGROUND

The probability of an intrusion into sensitive corporate data increases, as attackers become more common and more sophisticated. Even the most secure businesses are subject to the risk of an attack that could halt electricity supplies or expose restricted data. Many leading corporations that have recently fallen prey to a breach in their data through one or more third-party service providers.

90% of today's organizations depend on third-party entities. During 2020, about 80% of large organizations have experienced a cybersecurity breach that originated from vulnerabilities in their third-party ecosystem. Public companies that experience a cybersecurity breach suffer a drop in share price. In addition, the average cost of a data breach increased for mid-sized organizations.

It only takes a single compromised third-party entity to cause the organization millions of dollars in damages. Hence, organizations wish to evaluate the cyber security risk of third-parties they work with as part of evaluating the organization's cyber security risk. In addition, mitigating the cyber risk of an organization's third-party ecosystem enables organizations to reduce their chances of a breach, improve their security posture and become more compliant.

SUMMARY

The invention, in embodiments thereof, discloses methods for computing a cyber security risk of third-party entities to enable organizations to reduce their chances of a breach, improve their security posture and become more compliant. The processes elaborated below enable organizations to manage cyber security risks of their organization, and of other organizations, for example organizations they cooperate with.

Other embodiments disclose methods that enable organizations to prioritize actions concerning cyber security threats, predict the economic impact a third-party cyber security breach will have on the organizations and proactively reduce the probability of a third-party cyber security breach. The economic impact may be used to set and/or calculate insurance premiums for organizations facing cyber security threats.

Other embodiments disclose training a software model using data relating to over many organizations, for example at least 1,000, at least 10,000 or at least 100,000 organizations. The model may utilize machine learning techniques desired by a person skilled in the art. The model may utilize artificial intelligence techniques desired by a person skilled in the art. The organizations may be varied according to various properties. The properties may be general properties, such as size, geography and sector. The properties may be technologic, such as number and type of technologies used by each organization. The properties may relate to data security, such as number of open ports in the organization. The model may also receive an indication on whether or not the organization suffered a security event, such as a data breach or another type of cyberattack. The software model is configured to build a profile of a typical organization that suffered a security event and a typical profile of an organization that did not suffer a security event.

Other embodiments disclose creating a risk score of an organization by creating a risk profile for an organization. The organization is compared to other organizations, to create a benchmark for the organization. The benchmark may be associated with a specific security event type, or a total security score of the organization.

Other embodiments may also include collecting data about the organizations in the model, in order to update organizations' risk profiles, benchmarks, and trends. The collected data may include both cyber and non-cyber risk indicators. After collecting the data, the software model generates the organization's risk profile and compare the risk profile to other organizations.

Other embodiments disclose a computerized method for evaluating an organization's risk to be exposed to cyber security events, the method including receiving a request to evaluating a specific organization's risk to be exposed to cyber security event, the request includes information about the specific organization, collecting security-based risk indicators about the specific organization, inputting the security-based risk indicators about the specific organization into a model, the model obtains weights to classifiers that represent an impact of a specific organization to be exposed to a security event, computing a specific risk value for the specific organization according to values of the specific organization and the weights of the classifiers.

In some cases, the specific risk value represents a relative rank for the specific organization.

In some cases, the specific risk value represents a rank for the specific organization to be exposed to a specific type of a security event.

Other embodiments disclose a computerized method for evaluating an organization's risk to be exposed to cyber security events, the method including collecting security-based risk indicators about multiple organizations and an indication on whether or not each of the multiple organizations suffered a security event, inputting values of the security-based risk indicators about multiple organization into a software model, running the software model multiple times, each time the software model outputs one or more classifiers that distinguish organizations that suffered the security event from organizations that did not suffer the security event, where the one or more classifiers include classifiers selected from the security-based risk indicators, assigning a weight to classifiers outputted by the software model according to the number of times each classifier was outputted by the software model, where the weights represent an impact of a specific organization to be exposed to a security event.

In some cases, the software model is a random forest model.

In some cases, the method further includes running the model for multiple different security event types, identifying the classifiers that are relevant for each security event type of the multiple different security event types.

In some cases, the method further includes assigning a weight for classifiers relevant for each security event types of the multiple different security event types.

In some cases, the method further includes computing a relative security event rank for a specific organization, the relative security event rank defining a risk of the specific organization to suffer from a specific security event based on the values of the security-based risk indicators of the specific organization relative to other organizations.

In some cases, the method further includes computing a total rank for the specific organization according to the relative security event ranks computed for the specific organization for various event types and a weight of each security event type of the multiple event types.

In some cases, the method further includes generating a data record of each organization including values for the security-based risk indicators and inputting the multiple records into the model. In some cases, the method further including adjusting the record of each organization according to known vulnerabilities of the values for the security-based risk indicators. In some cases, the record further includes non-security risk indicators of the organization. In some cases, the security-based risk indicators are unique to each organization. In some cases, the security-based risk indicators include security vulnerabilities of the organization. In some cases, the security-based risk indicators include technologies used by the organization.

The subject matter discloses a computerized method for evaluating an organization's risk to be exposed to cyber security events, the method comprising collecting security-based risk indicators about multiple organizations and an indication on whether or not each of the multiple organizations suffered a security event; inputting values of the security-based risk indicators about the multiple organization into a software model; running the software model multiple times, the software model outputs multiple sets of one or more classifiers, each set of one or more classifiers distinguishes organizations that suffered the security event from organizations that did not suffer the security event; wherein the one or more classifiers comprise classifiers selected from the security-based risk indicators; assigning a risk score for a specific organization according to the importance score of specific classifiers that are related to the specific organization and the score assigned to those classifiers; computing an underwriting score for the specific organization, said computing comprises: comparing a type-based risk score for the specific organization to a type-based benchmark value representing a standard risk score in a specific risk type of multiple other organizations of a reference group having similar characteristics with the specific organization; assigning a risk-based value based on the risk-based comparison; accumulating multiple risk-based values for a group of relevant risk types.

In some cases, the risk-based value is assigned based on a range of optional values, the range corresponds to the importance of classifiers related to the specific organization.

In some cases, the risk-based value increases when the distance between the type-based risk score for the specific organization to a type-based benchmark value increases.

In some cases, the risk-based value increases in multiple predefined offset values, each of the predefined offset values is related to a range of distances between the type-based risk score for the specific organization to a type-based benchmark value increases In some cases, computing the underwriting score comprises assigning values that represent critical key findings of the specific organization.

In some cases, the method further comprises outputting an underwriting recommendation to an insurance company based on the underwriting score and the finding score, said underwriting recommendation is selected from a closed group of recommendations. In some cases, the software model is a machine-learning based model.

In some cases, the method further comprises assigning a weight to classifiers outputted by the software model according to the importance of each classifier appeared in a set of the multiple sets outputted by the software model; wherein the weights represent an impact of a specific organization to be exposed to a security event.

In some cases, the method further comprises running the model for multiple different security event types; identifying the classifiers that are relevant for each security event type of the multiple different security event types.

In some cases, the method further comprises assigning a weight for classifiers relevant for each security event types of the multiple different security event types.

In some cases, the method further comprises computing a relative security event rank for a specific organization, said relative security event rank defining a risk of the specific organization to suffer from a specific security event based on the values of the security-based risk indicators of the specific organization relative to other organizations.

In some cases, the method further comprises computing a total rank for the specific organization according to the relative security event ranks computed for the specific organization for various event types and a weight of each security event type of the multiple event types.

In some cases, the method further comprises generating a data record of each organization comprising values for the security-based risk indicators and inputting the multiple records into the model. In some cases, the method further comprises adjusting the record of each organization according to known vulnerabilities of the values for the security-based risk indicators.

In some cases, the record further comprises non-security risk indicators of the organization. In some cases, the security-based risk indicators are unique to each organization. In some cases, the security-based risk indicators comprise the security vulnerabilities of the organization. In some cases, the security-based risk indicators comprise technologies used by the organization.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The invention, in embodiments thereof, discloses evaluating a risk score for an organization. The risk score is computed for each organization by creating a risk profile mapping and comparing the risk profile of a specific organization to risk profiles of other organizations, for example in association of a specific event type. The risk profile of an organization is created by a computerized model that receives as input cyber and non-cyber risk indicators. The risk may be internal for an organization, or depend on third-party entities cooperating with the organization, for example as vendors, partners, design partners, clients and the like. The methods may also include comparing an organization's risk profile to other organizations' risk profile, to compute the organization's benchmark risk score. The benchmark risk score may be computed for a specific event type or for the total organization's security risk.

The term "cyber security event" refers to an attack performed on data or computer resources of an organization in order to steal or damage data and/or other resources. Examples of such events include, but are not limited to, downtime, data theft, data loss, ransomware.

The term "organization"—refers to a company, a school, a firm, a non-profit organization (NGO), a computerized network, infrastructure, government-related entity having electronic equipment and the like.

Figure 1:
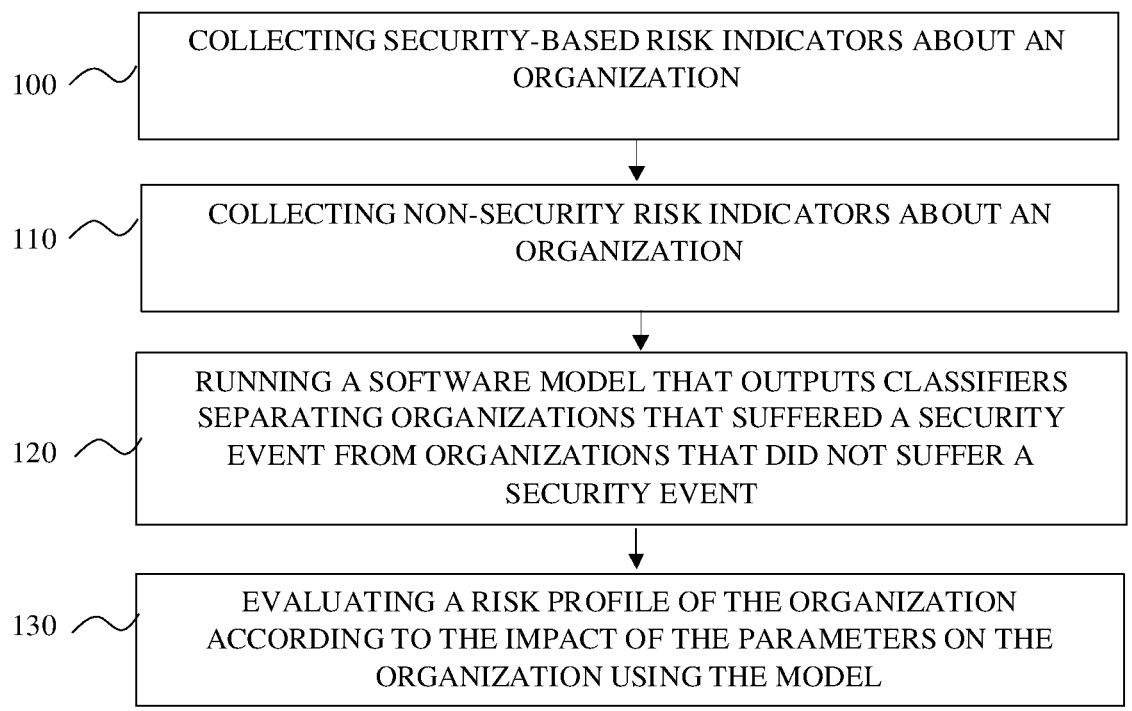
FIG. 1 shows a method of training and using a model for evaluating a security risk of an organization, according to an exemplary embodiment of the invention.

FIG. 1 shows a method of training and using a model for evaluating a security risk of an organization, according to an exemplary embodiment of the invention.

Step 100 discloses collecting security-based risk indicators about an organization. The security-based risk indicators may include the number of open ports in the organization, the number of technologies used by the organization, the security vulnerabilities of the technologies used by the organization, leaked passwords of the organization, date of password leakage and the like. The security-based risk indicators may also include computerized tools available in the market to solve the vulnerabilities associated with the organization. As long as there are commonly available solutions, this may affect the organization's risk evaluation.

Step 110 discloses collecting non-security risk indicators about an organization. The non-security risk indicators may include the organization's business sector, such as finance or agriculture, the organization's number of employees, the organization's age, the location of the organization's headquarters and the like.

Step 120 discloses running a software model that outputs classifiers separating organizations that suffered a security event from organizations that did not suffer a security event. The software model is first trained to output classifiers that impact on an organization's likelihood to suffer a security event. Then, a data record of a specific organization, for example including non-security risk indicators and security-based risk indicators, is inputted into the software model.

Step 130 discloses evaluating a risk profile of the organization according to the impact of the parameters on the organization. The risk profile is outputted by the software model. The risk profile may be associated with a specific security event, or as a total rank of the organization. The risk profile may be relative to the other organizations in the model's database, or an absolute rank, for example estimating a specific organization's probability to suffer a security event.

Figure 2:
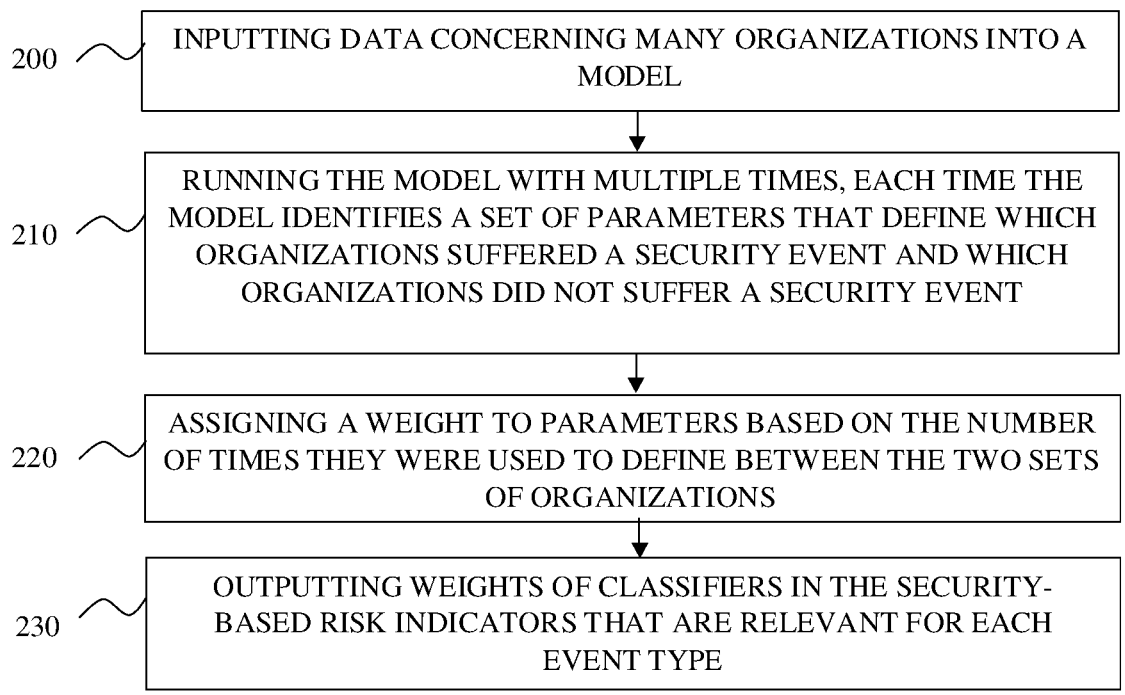
FIG. 2 shows a method of training the model evaluating a security risk of an organization, according to an exemplary embodiment of the invention.

FIG. 2 shows a method of training the model evaluating a security risk of an organization, according to an exemplary embodiment of the invention.

Step 200 discloses inputting data concerning many organizations into a software model. In some cases, the data includes non-security risk indicators and security-based risk indicators. The data may be inputted by a computer software, such as a scraping software, or by a person operating the model. The data fields assembling the data records of the multiple organizations may be stored in a memory address associated with each organization. In some cases, the data records may be stored in an online data storage service, such as Amazon AWS, which is then accessible to the software model.

Step 210 discloses running the model with multiple iterations, each iteration the model identifies a set of parameters that define which organizations suffered a security event and which organizations did not suffer a security event. The output of each iteration is either "failure to provide a set of parameters" or a set of parameters. The set of parameters may include: 1. only values of non-security risk indicators. 2. only values of security-based risk indicators. 3. Both values of non-security risk indicators and values of security-based risk indicators.

Examples of outputs having a set of parameters may be "having more than 100 passwords that leaked in the past 6 months and less than 180 employees, operating in the entertainment industry in France". The set of parameters denotes that among all the organizations' data records inputted into the model, and indications on whether or not the organizations suffered a security event, the organizations that match the set of parameters outputted in the iteration suffered a security event, while all the other organizations in the model's database did not suffer a security event.

This process may be performed in general for any type of security event. In such case, the model only checks whether or not the organizations suffered any security event. In some other exemplary embodiments of the invention, the model is run on a specific security event, a type of a security event, or a group of security events. The output of the set of parameters or parameters' values may define which organizations suffered from either ransomware or data theft.

At the end of step 210, the model outputs multiple sets of parameters, each set includes one or more parameters or parameters' values that distinct organizations that suffered from a security event from organizations that did not suffer from a security event, either a security event in general or one or more specific security events.

Step 220 discloses assigning a weight to parameters based on the number of times they were used to define between the two sets of organizations. For example, a certain technology used by organizations is included in the set of parameters 15 different times, while a parameter value of "having more than 800 employees" was included in the set of parameters 4 different times, among 200 different sets of parameters. This may mean that the certain technology may have a weight of 0.075 (15 times divided by the total number of sets, 200) while the number of employees is assigned a weight of 0.02.

Step 230 discloses outputting weights of classifiers in the security-based risk indicators that are relevant for each event type. Some of the classifiers may be relevant only in some event types. For example, the model outputted a total of 120 classifiers from 2,000 iterations. The 2,000 iterations include 400 iterations for each event type, according to an indication in the database of whether or not the organization suffered a security event of a specific event type. The output is weights of classifiers in specific event type. For example, for event type #1, there are classifiers #12, #14 and #66. The weight of classifier #12 for event type #1 is 0.2, the weight of classifier #14 for event type #1 is 0.4 and the weight of classifier #66 for event type #1 is 0.2. The weight of classifier #66 for event type #3 may be zero, that is classifier #66 was not part of any set of parameters that distinct organizations that suffered from security event #3 from organizations that did not suffer from security event #3.

Figure 3:
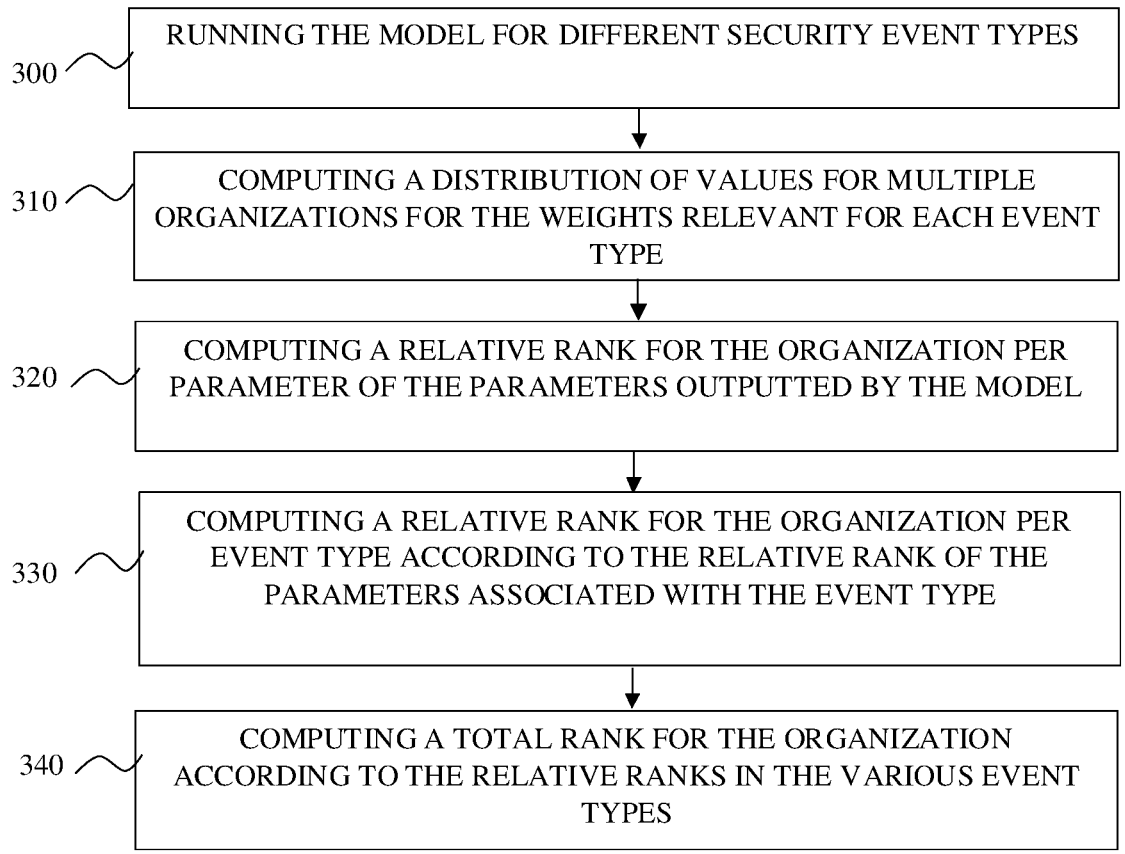
FIG. 3 shows a method of using the model evaluating a security risk of an organization, according to an exemplary embodiment of the invention.

FIG. 3 shows a method of using the model evaluating a security risk of an organization, according to an exemplary embodiment of the invention.

Step 300 discloses running the model for a specific organization. Running the model is done after the training process, when the model obtains weights of the classifiers, and which classifiers are relevant for each security event type. When running the model for a specific organization, the specific organization's properties are inputted into the model. The properties include security-based risk indicators and non-security risk indicators.

Step 310 discloses computing a distribution of values for multiple organizations for the weights relevant for each event type. The distribution indicates the relativity of values compared to values of other organizations. For example, the model stores a distribution of the number of open ports of all the organizations in the model's database, or the number of open ports per 1,000 employees. The distribution may be a uniform distribution or any other distribution selected by a person skilled in the art. The output of the distribution process is a distribution of values associated with a specific parameter for all the organizations in the database.

Step 320 discloses computing a relative rank for the specific organization per classifier of the classifiers outputted by the model. The tested specific organization is compared with the organizations in the model. The output of this step is not the absolute number of open ports, for example, but the relative rank of the specific organization among other organizations as to the number of open ports. In some examples, the output of the relative rank is the percentile of the specific organization as to the specific classifier. This process may be repeated for all the classifiers of a specific organization, or for all the classifiers that are relevant for a specific event type, or for any security event.

Step 330 discloses computing a relative rank for the specific organization per specific event type according to the relative rank of the parameters associated with the specific event type. The relative rank may be computed according to the relative ranks that the specific organization received per classifier, and the weights that the classifiers received in the training process. For example, there may be 5 relevant classifiers for a specific event type. The 4 relevant classifiers have different weights, for example according to the number of times they appeared in the training process. The weights of the classifiers for the specific event type may be arranged as the following array: [0.1, 0.15, 0.5, 0.05, 0.2]. The sum of weights may be a constant value, for example 1. In order to compute the relative rank for the specific organization per specific event type, the model may sum the multiplications of the weights with the relative rank in each classifier. For example, RRET (relative rank event type) equals WC1*R1+ WC2*R2 . . . +WVn*Rn, as WC denotes the weight for each classifier and R denotes the relative rank of the specific organization in each classifier.

Step 340 discloses computing a total rank for the specific organization according to the relative ranks in the various event types and weights of each event type. The total rank may be computed according to the relative ranks of the various event types and weights of the event types. The weights of the event types may be computed according to the general probability of occurrence of each event type. For example, ransomware has a higher weight than data theft. The total rank for the specific organization may be a sum of the multiplications of the weights of the event types with the relative rank of the specific organization in each event type as computed in step 330. For example, TR (total rank) equals WE1*R1+WE2*R2 . . . +WEn*Rn, as WE denotes the weight for each event type and R denotes the relative rank of the specific organization in each event type.

Figure 4:
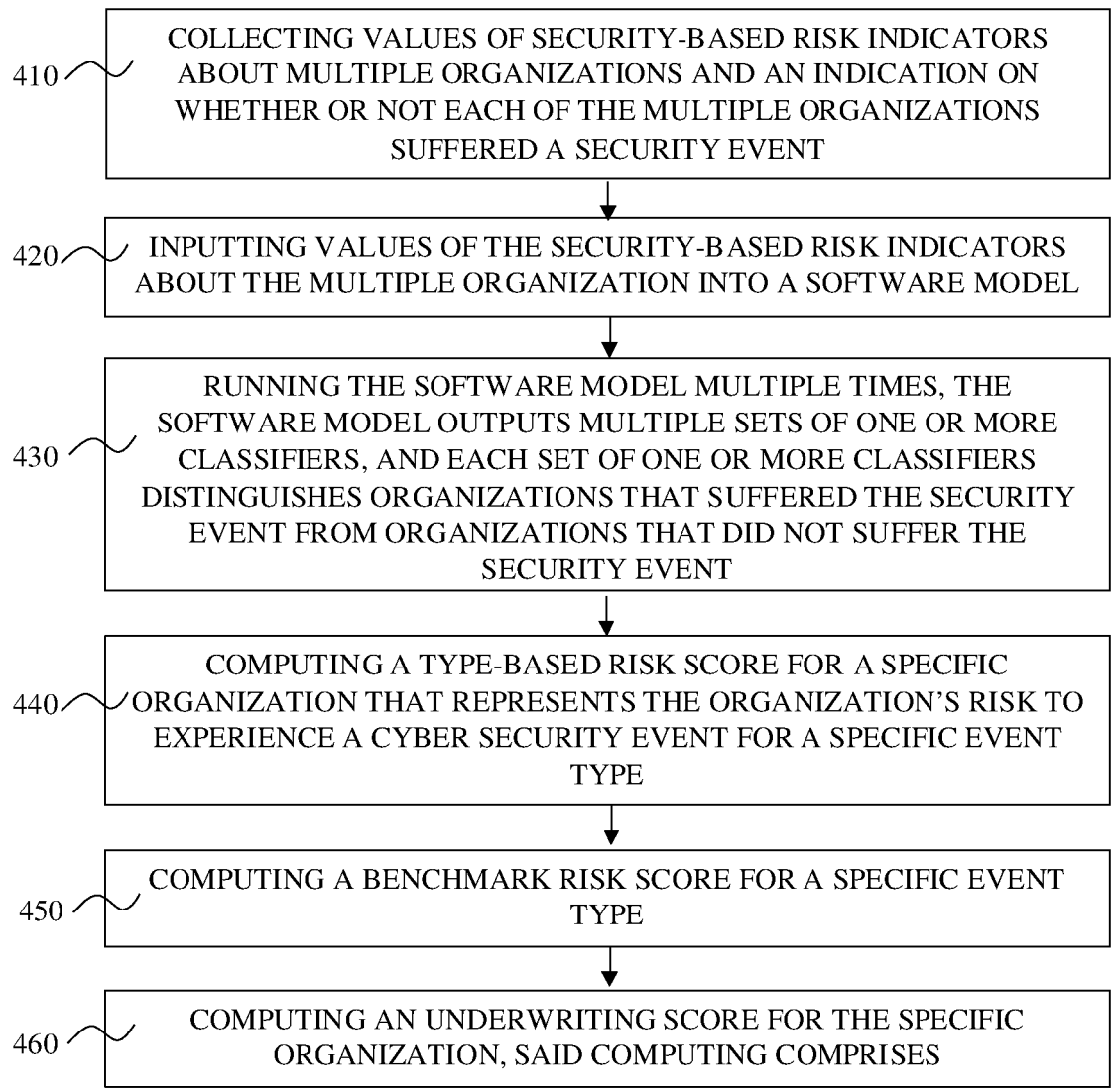
FIG. 4 shows a method of using the model to compute an underwriting score of an organization, according to an exemplary embodiment of the invention.

FIG. 4 shows a method of using the model to compute an underwriting score of an organization, according to an exemplary embodiment of the invention. The underwriting score is a comparative score of a specific organization relative to a reference group (benchmark), the reference group has at least one mutual property to the specific organization, such as size, technology, geography, and the like. The purpose of the underwriting score is to reflect the level of similarity or dissimilarity of an organization to its peers with respect to its level of cyber-security risk.

Step 410 discloses collecting values of security-based risk indicators about multiple organizations and an indication on whether or not each of the multiple organizations suffered a security event. The values may indicate the number of open ports of the specific organization, an identifier representing the technological fields of the organization, number of vulnerable technologies and the like. The values may be collected using a user interface or an interface enabling a server or another remote device to input data into the device or machine that executes the instructions disclosed herein.

Step 420 discloses inputting values of the security-based risk indicators about the multiple organization into a software model. inputting may be performed by automatically copying or loading the values into a dedicated placeholder or memory address in the model or accessible to the model.

Step 430 discloses running the software model multiple times, the software model outputs multiple sets of one or more classifiers, and each set of one or more classifiers distinguishes organizations that suffered the security event from organizations that did not suffer the security event. For example, in the first run, the output includes only classifiers #13 and #32, and in the second run, the output includes only classifiers #2, #32, and #334. In some cases, the one or more classifiers comprise classifiers selected from the security-based risk indicators.

Step 440 discloses computing a type-based risk score for a specific organization that represents the organization's risk to experience a cyber security event for a specific event type. The type-based risk score for a specific event type may be computed according to the importance of the specific classifiers that are related to the specific organization's exposure to the specific event type. The importance of the specific classifiers may be outputted by the model, for example, a statistical model. the importance of the specific classifiers may be the contribution of the classifiers to the correlation with the target values outputted by the model during step 430. The importance may be another value outputted by the model, for example, how often a classifier appears in a classification model.

Step 450 discloses computing a benchmark risk score for a specific event type. The benchmark risk score is computed for multiple organizations, for example, all the organizations in a given tech sector, geographic sector, size, and the like. The benchmark risk score may vary among sectors when relating to the same event type. The benchmark risk score may be based on the security-based indicators and the classifiers outputted by the model.

Step 460 discloses computing an underwriting score for the specific organization, said computing comprises. Computing the underwriting score may comprise comparing the type-based risk score for the specific organization to a type-based benchmark value representing a standard risk score in a specific risk type of multiple other organizations of a reference group having similar characteristics with the specific organization. The reference group may include other organizations in the same sector, size, country, a combination of the above, and other properties desired by a person skilled in the art. The comparison may result in assigning a risk-based value based on the risk-based comparison. For example, in case the organization's type-based risk score is slightly better than the benchmark, the risk-based value is a small positive value, in case the organization's type-based risk score is significantly better than the benchmark, the risk-based value is a large positive value, in case the organization's type-based risk score is slightly worse than the benchmark, the risk-based value is a small negative value, in case the organization's type-based risk score is significantly worse than the benchmark, the risk-based value is a large negative value.

The range of the type-based risk score may vary according to the importance of the event type. For example, ransomware may have a maximal value of 10 while data leaks may have a maximum number of 30. In some cases, the type-based risk score may be +1 for a small difference from the benchmark and +5 for a big difference, but in a more important event type, the type-based risk score may be +4 for a small difference from the benchmark and +15 for a big difference. The maximum number for a type-based risk score may be computed according to an AI-based supervised regression model. The model may suggest the maximum number for a type-based risk based on historical insurance cyber claims and the likelihood of each insurance coverage being activated in comparison to other coverages Then, the multiple risk-based values of the various event types may be accumulated. In some cases, computing the underwriting score comprises computing a key finding score that represents critical key findings of the specific organization. The critical key findings are known to significantly contribute to enabling cyber security events. The selected keys and the weight of each key will be determined according to an AI-based classification model that will be trained on historical insurance cyber claims. The model may suggest the weight of each key finding based on its effect on historical cyber security events and the likelihood of a similar cyber event happening.

Examples to Key Findings Include

RDP (Remote Desktop Protocol) is open.
Vulnerabilities technology with a severity level of "Critical" by NIST.
Multiple exposed credentials.
No Anti-DDoS Mitigation.
The Overall Underwriting Score may be a weighted average between the Coverages Underwriting Score and the Key Findings Score. For example 0.72*Coverages Underwriting Score+0.28*Key Findings Score.

The model is a software-based model operating on a server or any other one or more electronic devices having processing capabilities. The electronic device on which the model runs includes a processor and a memory for storing the instructions executed the processor. The instructions are configured to implement the processes disclosed above.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings described herein without departing from the essential scope thereof. Therefore, it is intended that the invention not be limited to any particular embodiment contemplated herein.

What is claimed is:

1. A computerized method for evaluating an organization's risk to be exposed to cyber security events, the method comprising:
    collecting security-based risk indicators about multiple organizations and an indication on whether or not each of the multiple organizations suffered a security event;
    inputting values of the security-based risk indicators about the multiple organization into a software model;
    running the software model multiple times, the software model outputs multiple sets of one or more classifiers, each set of one or more classifiers distinguishes organizations that suffered the security event from organizations that did not suffer the security event, wherein the one or more classifiers comprise classifiers selected from the security-based risk indicators;
    assigning a risk score for a specific organization according to the importance of specific classifiers related to the specific organization; and
    computing an underwriting score for the specific organization, wherein said computing comprises
        comparing a type-based risk score for the specific organization to a type-based benchmark value representing a standard risk score in a specific risk type of multiple other organizations of a reference group having similar characteristics with the specific organization,
        assigning a risk-based value based on the risk-based comparison,
        accumulating multiple risk-based values for a group of relevant risk types, and
        assigning a weight to classifiers outputted by the software model according to the number of times each classifier appeared in a set of the multiple sets outputted by the software model, wherein the weights represent an impact of a specific organization to be exposed to a security event.

2. The method of claim 1, wherein the risk-based value is assigned based on a range of optional values, the range corresponds to the importance of the specific classifiers related to the specific organization.

3. The method of claim 1, wherein the risk-based value increases when the distance between the type-based risk score for the specific organization to a type-based benchmark value increases.

4. The method of claim 3, wherein the risk-based value increases in multiple predefined offset values, each of the predefined offset values is related to a range of distances between the type-based risk score for the specific organization to a type-based benchmark value increases.

5. The method of claim 1, wherein computing the underwriting score comprises assigning values that represent critical key findings of the specific organization.

6. The method of claim 1, further comprises outputting an underwriting recommendation to an insurance company based on the underwriting score and the risk score, said underwriting recommendation is selected from a closed group of recommendations.

7. The method of claim 1, wherein the software model is a random forest model.

8. The method of claim 1, further comprising:
    running the model for multiple different security event types;

identifying the classifiers that are relevant for each security event type of the multiple different security event types.

9. The method of claim 8, further comprising assigning a weight for classifiers relevant for each security event types of the multiple different security event types.

10. The method of claim 9, further comprising computing a relative security event rank for a specific organization, said relative security event rank defining a risk of the specific organization to suffer from a specific security event based on the values of the security-based risk indicators of the specific organization relative to other organizations.

11. The method of claim 10, further comprising computing a total rank for the specific organization according to the relative security event ranks computed for the specific organization for various event types and a weight of each security event type of the multiple event types.

12. The method of claim 1, further comprising generating a data record of each organization comprising values for the security-based risk indicators and inputting the multiple records into the model.

13. The method of claim 12, further comprising adjusting the record of each organization according to known vulnerabilities of the values for the security-based risk indicators.

14. The method of claim 12, wherein the record further comprises non-security risk indicators of the organization.

15. The method of claim 1, wherein the security-based risk indicators are unique to each organization.

16. The method of claim 1, wherein the security-based risk indicators comprise security vulnerabilities of the organization.

17. The method of claim 1, wherein the security-based risk indicators comprise technologies used by the organization.

* * * * *